Nov. 10, 1936.    H. G. THOMAS    2,060,265
STEAM HEATING SYSTEM
Filed April 22, 1929    5 Sheets-Sheet 5

Inventor
Herbert G. Thomas
By Mack Jackson Bottome Dimmer
Attys.

Patented Nov. 10, 1936

2,060,265

UNITED STATES PATENT OFFICE 2,060,265

STEAM HEATING SYSTEM

Herbert G. Thomas, Evanston, Ill., assignor to Webster Tallmadge & Company Inc., East Orange, N. J., a corporation of New York Application April 22, 1929, Serial No. 357,034

38 Claims. (Cl. 236—91)

My invention relates to steam heating systems and the like.

While the invention is particularly applicable to systems operating with control of heat emission secured by fractional filling of the radiators, it is not to be limited to such systems but may be employed with modifications which will at once be apparent to those skilled in the art for use in other systems.

In considering the heating of a building it is assumed that the rate of heat loss from the building is a function of temperature difference between the prevailing outside temperature at any time and the predetermined inside temperature, which it is desired to maintain.

Obviously, the rate of loss varies with the type of building but after that factor is once determined it may be assumed to be a constant and the above principle is varied only by such factors as sun, wind, and the like. The function of the heating system is to supply heat in just sufficient quantity to make up for the loss so as to maintain the inside temperature at substantially a predetermined value, or schedule of values.

Fractional filling of the radiators means the variation of the volume of steam in the radiators. Heat emission is controlled by varying the volume of steam at substantially constant temperature and pressure. Such variable filling is secured by interposing a flow controlling orifice between the point of steam supply and the radiator, preferably an individual orifice is supplied for each radiator. Now if the steam mains are of adequate size, the pressure upon the supply side of the orifice is equalized upon all of the orifices of a group of radiators. The return line is kept at suitable pressure, which may be atmospheric or above or below atmospheric. Preferably the return pressure is kept below atmosphere for ease in circulating the steam, particularly at the lower flows. The return line pressure may be kept a constant by a suitable governor which may be adjustable under the control of the engineer in charge.

The supply pressure is varied within a range lying between the return line pressure for zero heat demand, as when the outside temperature is at 70° F., to a maximum for maximum heat demand for which the system is installed. The maximum heat demand in this region should be calculated on the basis of at least 10° below zero Fahrenheit.

Obviously, when the pressure difference upon the opposite sides of the orifice is zero the flow is zero. For maximum pressure difference upon the orifice the flow is a maximum. This maximum rate of flow is designed to equal and not substantially vary from the maximum demand rate of condensation of steam in the radiators corresponding to maximum heat demand and a filled radiator.

Since the flow is accurately predetermined and does not depend upon the temperature of the medium surrounding the radiator, the rate of condensation is not perceptibly increased by lowering the temperature of the medium surrounding the radiator. The radiators should be of sufficient capacity that for normal inside temperature of, for example, 70° F. the radiator will be filled upon maximum demand for heat. Obviously, a margin is desirable. Steam traps are not essential to the normal operation of a system of this character but preferably are employed to prevent the flow of steam into the return main for any inaccuracy in design or installation.

Such a system for full realization of the advantages thereof should be automatic in character to the extent of having the heat emitted by the radiators governed in accordance with the difference in temperature between the inside of the room, which is preferably kept at a predetermined value for normal operation, and the variable outside temperature.

There are special circumstances such as sun, wind, and the like, which cause variations of the loss of heat from the building which the heating system is designed to replace so as to maintain a uniform inside temperature.

The chief difficulty in making the heat emission of the radiators responsive to the temperature difference or weather conditions is the fact that thermostatic means may readily be developed to be directly responsive to temperature difference or to temperature but there is no simple way to control heat emission as a linear function of temperature or temperature difference.

The law relating to flow of fluid through an orifise is substantially $V^2=2gh$ where $V$ is velocity of flow, $g$ is the acceleration due to gravity, and $h$ represents head or pressure difference upon the orifice. From this it will be apparent that the variable $h$ or pressure difference upon the orifice must be controlled not in equal increments for equal increments of heat demand or temperature difference, but in unequal increments varying according to the square root of the increments of temperature difference.

My invention aims to provide a simple mechanism between a thermostatically responsive element and a control valve for automatically varying heat emission as a function of temperature difference. While I speak of a control valve as being the controlling element for varying the heat emission, I do not intend to be limited to a valve but may employ any equivalent mechanism which acts to secure a pressure difference upon the orifice.

For conditions of sun, wind and the like, it is often desirable to vary the percent of load in accordance with the percent variation of heat loss which such conditions make. For example, if one side of the building is exposed to the sun, the rate of heat demand therein is reduced, and it is desirable to cut down the rate of heat flow. On a windy day it may be desirable to increase the heat flow from the radiators above the normal rate. In large buildings it is advisable to divide the building into heating zones and operate the zones on different rates of heat emission.

Where the ratio between thermostatic action and steam pressure is a curve, as above explained, it is not a simple matter to increase or decrease the heat output throughout the range.

My invention aims to provide simple and effective means to vary the percent of normal load either by hand adjustment or by automatic adjustment. My invention also provides a manually controlled adjustment for varying the percent load in accordance with its heating schedule as, for example, day and night or holiday service, and also provides means for increasing the rate of heating as, for example, in bringing the building up to the normal working temperature.

The preferred form of the invention involves the use of a cam as controlling the relation between the thermostatic response and pressure difference variation, and a lever system having a movable fulcrum to change the percent of load of heat delivered. The cams may be directly operated or may be operated through remote control mechanism or through the use of relayed power.

The change in position of the cam follower may be translated into terms of movement of a valve or other controlling mechanism through electric, electro-pneumatic or electro-hydraulic or other mechanism.

I do not intend to be limited to the use of the cam as embodying the flow equation as an electric resistance might be employed to embody such relation.

Now in order to acquaint those skilled in the art with the manner of constructing and operating a device embodying my invention, I shall describe in connection with the accompanying drawings a specific form of apparatus embodying my invention.

In the drawings:

Figure 4A is a top plan view of the thermostat body shown in Figure 4;

Figure 1:
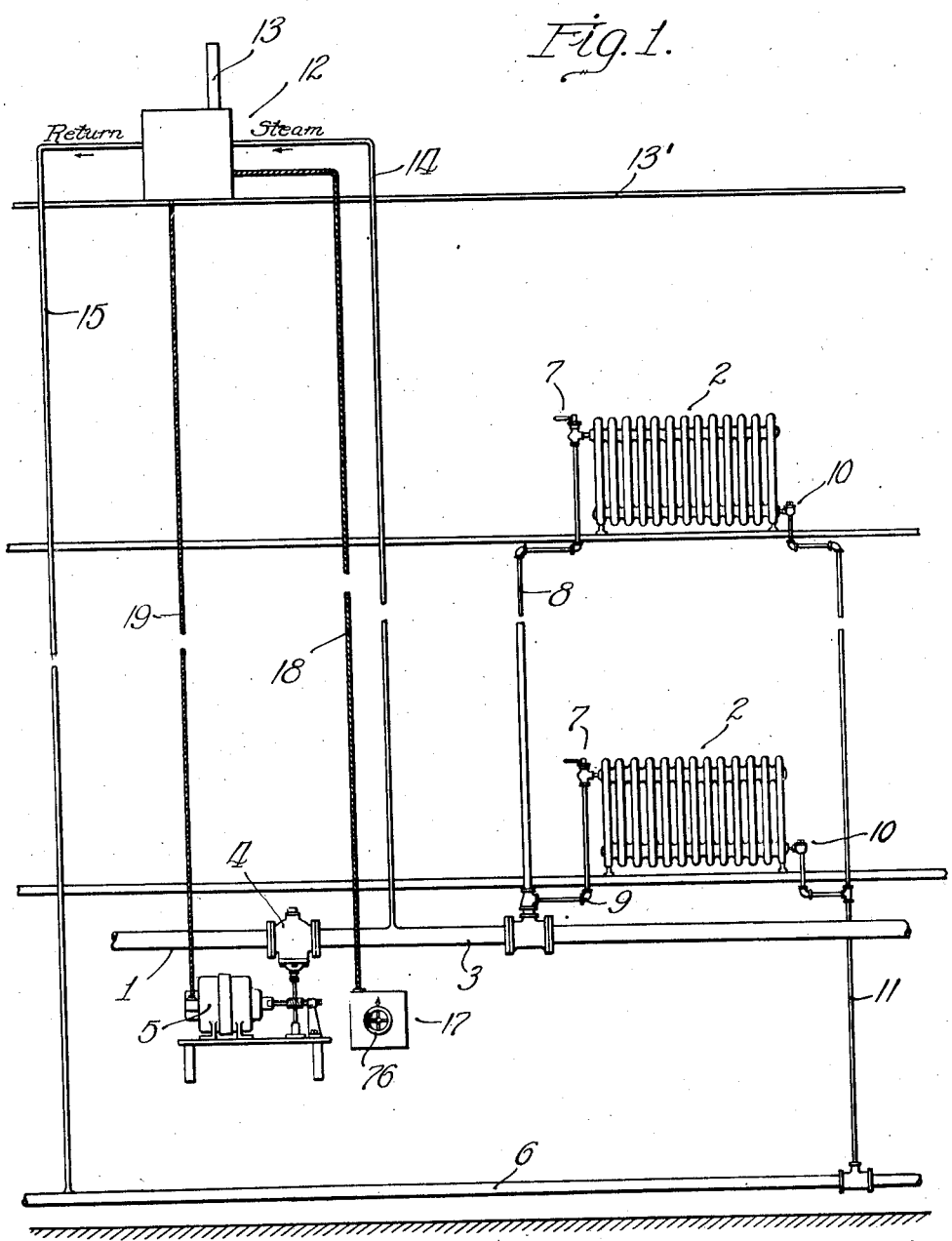
Figure 1 is a diagram of a steam heating system embodying my invention.

Referring now to Figure 1, a steam supply main 1 provides steam at any desired pressure for use in the heating system having the radiators 2, 2. The steam main 1 is connected to the supply main 3 through a control valve 4, which is of any suitable type for controlling the rate of flow from the main 1 to the supply main 3 in order to regulate the pressure in the supply main 3.

The valve 4 may be merely a throttle valve or it may be a pressure reducing valve variably loaded to control the pressure prevailing in the supply main 3. This valve 4 is suitably controlled by a reversible motor 5 which, under thermostatic control, suitably governs the valve 4 to maintain a pressure in the supply main 3 representing either a desired absolute value or a desired differential with respect to the pressure in the return main 6. The radiators 2, 2 are connected to the supply main 3 through suitable orifices contained in the valves 7, 7. These valves 7, 7 preferably contain orifice plates for interposing orifices of predetermined size between the supply main 3 and the interior of the radiator. The valves 7, 7 permit the selection of a suitable size of orifice within the control of the operator. In lieu of such modulation valve 7, 7 fixed orifices may be provided over which the occupant of the room has no control.

The valves 7, 7 or the orifices which may be substituted for them are interposed between the branch lines such as 8 and 9 and the radiators, these branch lines being supplied from the supply main 3. The radiators 2, 2 are connected through the traps 10 to return pipe 11 which connects with the return main 6.

The thermostatic traps 10, 10 are of known construction and are adapted to shut off the radiators from the return connection in case they are impinged by steam in order to prevent loss of steam either through overload of the radiator or through any error in design or installation of the radiator, and also to prevent loss of steam when the radiators are completely filled.

The return line 6 is preferably connected to a vacuum pump provided with a suitable governor for maintaining a predetermined pressure below atmosphere in said return main 6. It is not essential to keep the return main below atmosphere as it may be an open return main, that is, operated at atmospheric pressure, if desired.

The motor 5 which controls the valve 4 is in turn controlled by a governing mechanism 12 shown in Figure 1 as disposed upon the roof 13' of the building. This governing mechanism comprehends a thermostat 13 and a pressure conveying tube 14 leading from the control element 12 to the supply main 3, and a pressure conveying tube 15 connecting the control mechanism 12 with the return main 6. The control mechanism 12 is under the control of a manually operated variator 17 located at the station of the engineer or attendant, the variator 17 functioning to control the percent loading of the heating system, as will be more apparent later.

Figure 2:
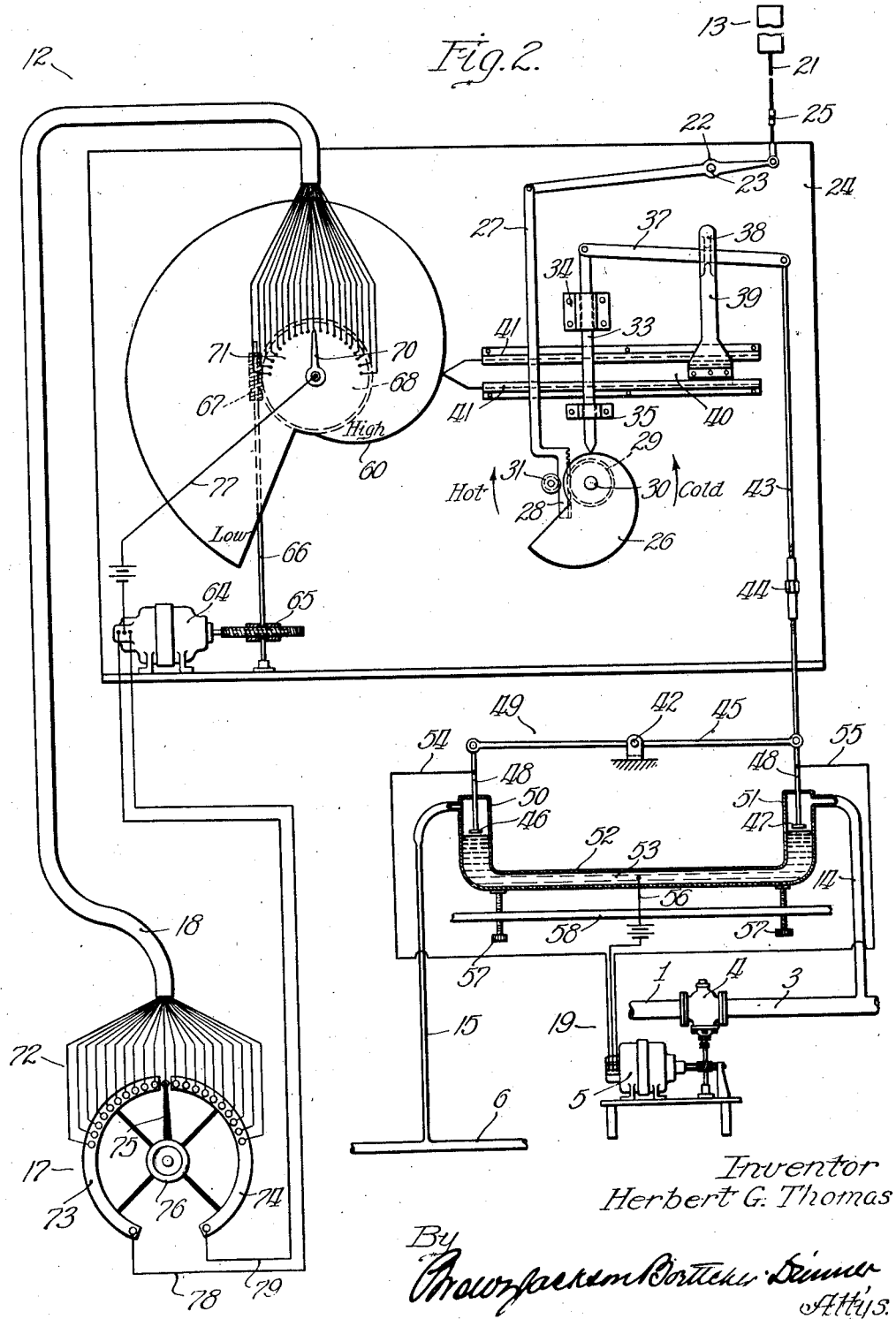
Figure 2 is a diagrammatic showing of the control mechanism.
Figure 3:
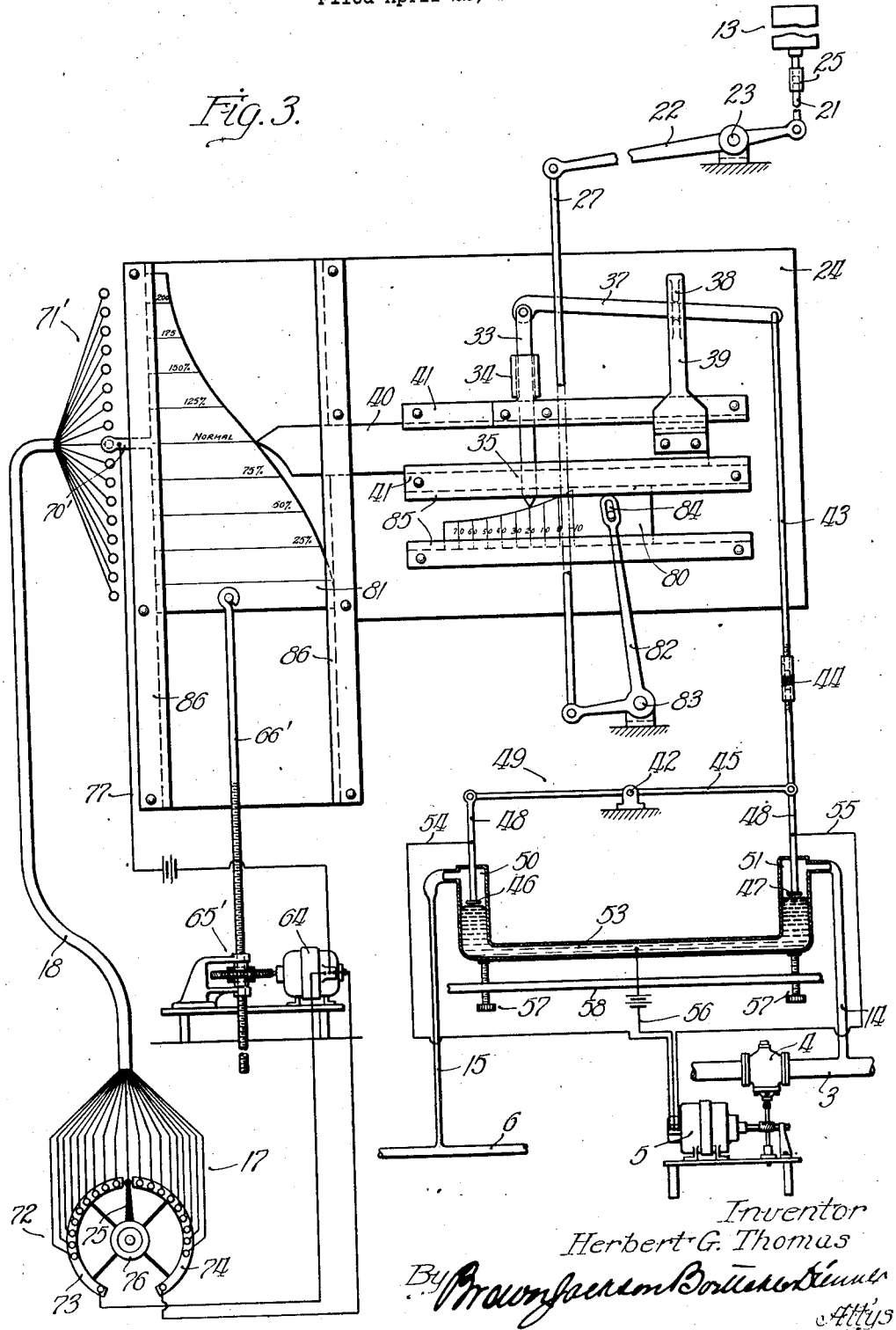
Figure 3 is a modified form of control mechanism shown diagrammatically as in Figure 2.

The control mechanism is illustrated diagrammatically more in detail in Figure 2 and a modification thereof in Figure 3.

A control cable 18 connects the variator 17 with the control mechanism 12 for remote control, and the cable 19 connects the motor 5 of the pressure control valve 4 with the control device 12.

Referring now to Figure 2, the thermostatic element 13 consists preferably of a chamber one wall of which is movable under the expansion of a contained liquid such as alcohol, or the like, said movable wall being connected through a rod 21 to the short arm of a lever 22 pivoted at 23 to the stationary frame 24. The operating rod 21 includes an adjustment 25 for coordinating the setting of the thermostat 13 with the cam 26. The long arm of the lever 22 is connected through a link 27 to a rack 28, which rack cooperates with a pinion 29 on the shaft 30 which bears the cam 26. The rack 28 is suitably guided as, for example, by the roller 31 to maintain its mesh with the pinion 29. By this connection motion of the movable wall of the thermostat 13 is transmitted into rotary motion of the cam 26 to adjust the cam to a position corresponding to the expansion or contraction of the thermostatic element 13 under the prevailing outside temperature.

A cam follower consisting of a slidable rod 33 guided in suitable guides such as 34, 35 cooperates with the cam 26 to rock the lever 37 which has an adjustable pivot 38 mounted upon a standard 39, said standard or bracket being in turn mounted upon the slide member 40 guided in suitable guides such as 41, 41.

The opposite end of the lever 37 is connected to a rod 43 containing an adjustable connection 44 to the lever 45. The lever 45 is pivoted at its central portion on the pivot 42, said pivot being connected to a suitable frame member. The lever 45 carries a pair of contact members 46 and 47 mounted upon rods such as 48, these rods being pivotally connected to the ends of the lever 45 so that for a given angular or rocking movement of the lever 45 one of the contacts 46, 47 will be moved up and the other will be moved down a like amount, or vice versa. The rods 48 pass into the legs or chambers 50 and 51 of a U-tube 52, which contains a body of mercury 53.

The leg or chamber 50 is connected by the pipe 15 to the return main 6 and the leg or chamber 51 is connected to the pipe 14 leading to the supply main 3. It can be seen, therefore, that in the normal operation of the system a difference of pressure prevails upon opposite ends of the body of mercury 53 corresponding to the difference in pressure upon the two sides of the controlling orifices at the radiators.

The motor 5 for operating the control valve 4 is a reversible motor, having one lead 54 connected to the contact 46 and so related to the body of mercury, which body of mercury is connected through the wire 56 to the common wire of the motor 5, that if the contact 46 electrically connects with the body of mercury corresponding to too high a differential of pressure upon the flow controlling orifices 7, the motor 5 will be operated to close or throttle down the valve 4, whereas the contact 47 and its lead 55 are so related to the body of mercury that if the pressure differential is not as great as is called for by the thermostat 13, contact will be made between the contact member 47 and the body of mercury 53 resulting in operation of the motor 5 to increase the opening of the valve 4 or otherwise to raise the pressure in the main 3.

Referring now to the slide 40 bearing the adjustable pivot standard 39 and the adjustable pivot 38, it is to be noted that this slide is under the control of a cam member 60 to which it is applied as a cam follower. A suitable spring may be applied to the slide 40 for causing it to follow the contour of the cam 60. The cam 60 is adjusted in accordance with the desired percentage of steam load which the radiators are to carry. That is to say, assuming that the cam 60 is in the position shown in Figure 2, the position of the slide 40 corresponds to 100% steam load which under normal conditions will maintain the rooms in which radiators 2, 2 are contained at the predetermined temperature which may, for example, be 70° F.

If now the cam 60 is rotated in a clockwise direction, it will be seen that movement of the slide 40 to the right, as viewed in Figure 2, will result in a change in ratio of the two arms of the lever 37 and also due to its motion in the horizontal line will cause a raising of the right hand end of said lever 37 with a consequent change in the position of the contacts 46, 47 with respect to the level of the mercury 53 in the chambers 50 and 51. That is to say, raising of the contact 47 and depression of the contact 46 calls for a smaller differential upon the orifices.

In like manner, rotation of the cam 60 in a counter clockwise direction resulting in travel of the slide 40 to the left, as viewed in Figure 2, will result in dropping the contact 47 and raising the contact 46 which calls for a higher pressure differential upon the radiator orifices.

It is to be noted that the cam 26 might be operated by hand in accordance with the action of the thermostat or thermometer corresponding to the thermostat 13, although I have shown, and prefer, automatic operation. Likewise, it is to be observed that the cam 60 may be directly operated by hand, or as I have shown the preferred construction, it may be operated from a remote control station by means of the variator 17. The cam 26 preferably embodies the relation between equal increment of temperature change at the thermostat 13 and unequal increment of pressure change in the supply line 3 to secure equal increment of heat delivered or heating fluid delivered through the orifices into the radiators 2.

The cam 60 embodies merely the proportionality between the two ends of the lever 37. That is to say, a predetermined motion of the cam 60 results in a predetermined percentage of normal loading of the heating system exemplified by the radiators 2. That is to say, if the cam 60 is set to deliver say 150% heating load, as for heating up the building rapidly, or for an unusual condition of weather corresponding to wind condition, the proportionality of movement throughout the range of the cam 26 is changed to such 150%.

Now it is to be observed that when the thermostat 13 stands at the zero point of heat load, that is, for example, 70° outside, the lever 37 will be strictly parallel to the guides 41, that is horizontal as viewed in Figure 2. Under that condition the pressure difference control element 49 should be subjected to zero pressure difference and the orifices should be subjected to zero pressure difference, and the contacts 46 and 47 should, likewise, be horizontal and both out of contact with the mercury 53. Now any change of position of the cam 60 corresponding to zero heat requirement effects no change in the steam demand. This is obvious, for 150% of zero load is no different than 100% of zero load. Hence it will be seen that the cam 60 and slide 40, which constitutes the cam follower for cam 60, change the percentage loading at any given setting equally throughout the entire load curve.

Likewise, if the cam 60 be rotated in a clockwise direction when the demand for heat is zero, a 75% load requirement when the demand is zero will not change conditions since 75% of zero load is zero. Likewise, the load curve will be changed to correspond to 75% load throughout the entire load curve.

The means I have shown for operating the cam 60 from the remote control station 17 includes an operating motor 64 driving through a worm gear connection 65, the shaft 66, which in turn operating through a worm gear connection 67 and worm wheel 68, moves the cam 60 forward or reverse. The cam 60 is connected to a contact member or selector contact 70 cooperating with a bank of contacts 71, this bank of contacts being connected through the cable 18 with a cooperating bank of contacts 72 at the control station. The bank of contacts 72 is adapted to be engaged by the two contact sectors or plates 73 and 74 separated from each other by the distance of one contact and a pointer 75 lying in line with the gap between the sectors 73 and 74 to indicate the position of the contact sectors 73 and 74. A suitable hand wheel 76 is provided for operating the contact making mechanism.

The selector contact 70 on the cam 60 is connected to the common return wire 77 leading to the motor 64 and the contact sectors 73 and 74 are connected through the control wires 78, 79 to the motor 64.

Now it can be seen that by moving the control wheel 76 to throw the pointer 75 to one side or the other from its central, or 100%, position, the motor will be energized to shift the cam so that the finger 70 stops upon the deenergized contact in the bank 71 corresponding to the position of the finger 75 in the variator 17.

Any other suitable form of remote control might be provided.

In Figure 3 I have shown a modified form of the device in which instead of circular cams 26 and 60, I provide the cams 80 and 81 having rectilinear motion. Otherwise the construction is the same. The link or rod 27 instead of being connected to the circular cam, as shown in Figure 2, is connected through a bell crank 82 to the rectilinear cam 80. The bell crank 82 is pivoted at 83 and the longer arm is connected through a pin and slot connection 84 to the rectilinear cam 80 which cooperates with the cam follower or rod 33. The cam 80 is shown as graduated for the temperatures corresponding to the load curve of the system. The length of the ordinates indicated by the vertical lines represents the pressure difference required upon the orifices 7 of the radiators 2 to give equal increment of flow and hence equal increment of volume within the radiators 2 for equal increment of temperature change as registered on the thermostat 13.

The same relation between the movable pivot 38 and its lever 37 prevails in this form of the device, that is to say, when the point of the cam follower 33 lies upon the ordinate corresponding to 70° on the rectilinear cam 80, the arm 37 is horizontal and the two electric contacts 46 and 47 are likewise horizontal and out of contact with the body of mercury 53. The U-tube 52 is provided with adjusting screws 57, 57 mounted on the supporting frame 58 for adjusting the position of said elements.

The rectilinear slide 80 is guided in suitable guides 85, 85 for maintaining the guided motion of the cam 80.

The cam 81 likewise is mounted in guides 86, 86 for guiding the same in a predetermined rectilinear path at right angles to the motion of the slide 40. The cam member 81 is graduated in terms of percent of normal load. As shown in Figure 3, the load cam 81 is in normal or 100% load position. By raising the cam 81 less than normal loading, as for example on night or holiday schedule, may be maintained, whereas if the cam 81 is lowered, higher than 100% load is to be carried and will be maintained throughout the temperature range of the system. The same relation previously explained is maintained, that is to say throughout the entire range of temperature variations for which the system is designed the percentage of load required will be maintained when the same is once adjusted at the cam 81.

The cam 81 is operated by the rod 66' under the control of the transmission 65' corresponding to the similar rotary transmission in the device of Figure 2, such transmission being operated by the motor 64 in forward or reverse direction in order to secure motion up or down as determined by the position of the control handle and contacts of the variator 17. The selecting contact finger 70', which is connected to the rectilinear load cam 81, cooperates with the bank of contacts 71' which are arranged in the path of movement of said contact selector finger 70'.

It will be understood that the cam followers are held in engagement with their cams by suitable spring means or the like.

Figure 4:
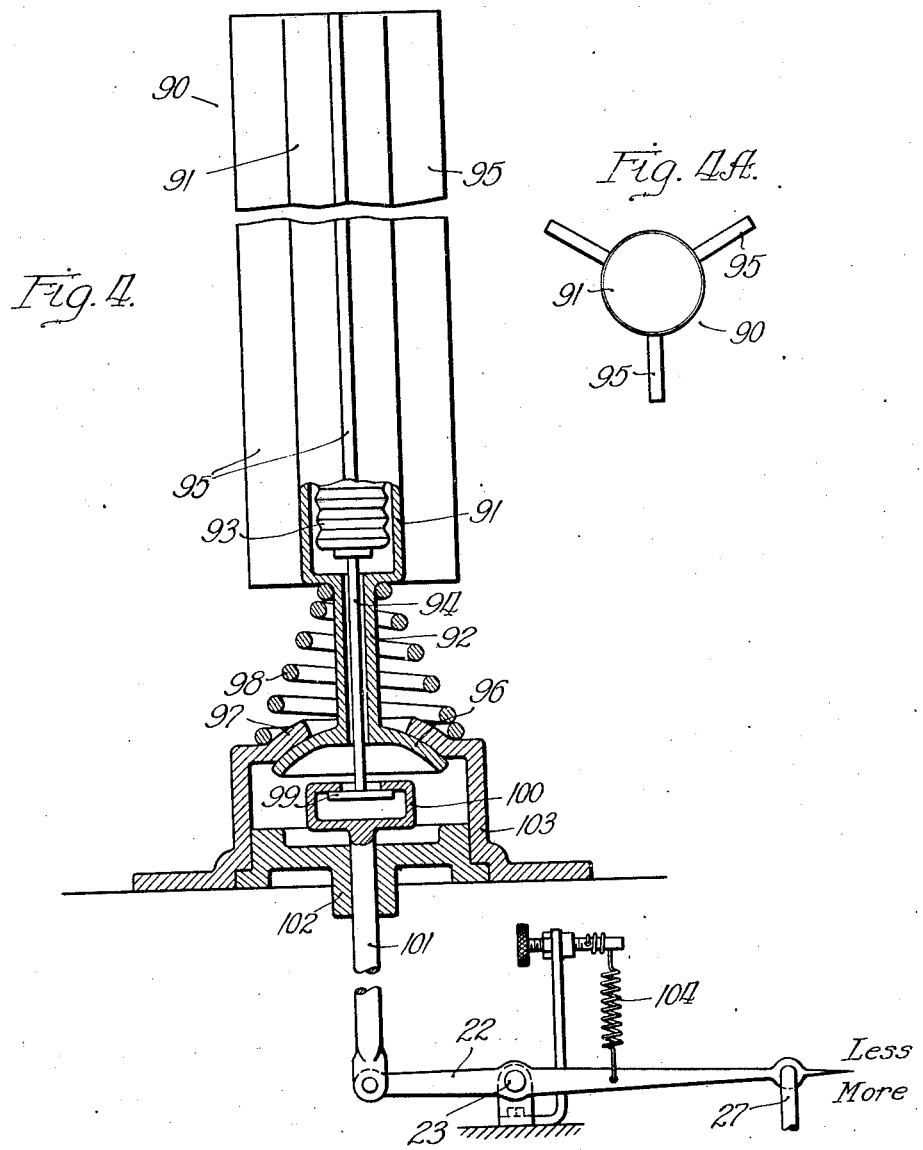
Figure 4 is a side elevation partly in section of a thermostatic element embodying sun and wind controls which thermostatic element may be employed in connection with the system shown in Figures 1, 2 and 3.

In Figure 4 I have shown a type of thermostat which is sensitive at the same time to sun and wind. This thermostat 90 comprises a tubular body 91 mounted upon a suitable stem or tube 92 and containing an expansible element 93 filled with a liquid such as alcohol, or any other suitable liquid or fluid, and having a moving stem 94 extending through the hollow stem 92 of the casing 91. The casing 91 may be open to atmosphere and to the sun.

The vertical and horizontal surfaces are adapted to be substantially proportional to the vertical and horizontal surfaces of the building which this thermostat represents. Thus it may be made accurately responsive to sun conditions. That is to say, if the sun strikes the top of the same it has less area exposed to such radiant heat than where the sun strikes the same at an angle or sidewise.

The body or container 91 may be provided with three or more vanes, such as 95, to render the same responsive to wind. If desired, a series of three dashpots may be disposed about the circumference of the stem 92 so as to steady the motion of the same under unsteady wind conditions.

The stem 92 which bears a movable thermostatic element has a spherical convex head 96 disposed within a spherical concave socket 97, a suitable spring such as 98 maintaining the two parts in engagement constituting a ball and socket joint.

The thermostat stem 94 which passes through the body stem bears a member such as the disc 99 at its lower end within a circular boxlike coupling member 100, the flange of which rests against the top of the disc 99. The coupling member or cage 100 is connected to the stem 101 which is guided at 102 in the frame 103. The stem 101 is connected to the lever 22 which may be identified with like part in Figures 2 and 3.

The cage 100 and the disc 99 are held in engagement with each other through the tension spring 104 which is suitably adjustable. The lever 22 is in turn connected to the rod 27 which may be identified by reference to Figures 2 and 3.

Now it may be seen that an expansion of the expansible member 93 under the action of atmospheric temperature or the sun's heat results in a rise of the rod 27, and this rod may be connected to the mechanism shown in Figure 2 or that shown in Figure 3, the result being a shifting of the contacts 46 and 47 calling for less pressure difference upon the orifices and, hence, less volume of steam delivered to the radiators, and a smaller percentage of the radiator space filled with steam corresponding to less load.

In like manner, contraction of the thermostatic element 93 results in raising the rod 101 and a depression of the rod 27 and this, as will be evident from either Figure 2 or Figure 3, results in an increased differential upon the radiator orifices and an increased percentage of the radiator space filled with steam and a larger emission of steam corresponding to the call of the thermostat.

Incidental wind pressure upon the side of the thermostat body from any direction results in a rocking of the thermostat about the center of the spherical parts 96, 97 and hence a parting of the disc 99 with respect to the flange of the cage 100, resulting in raising of said cage 100 and rasing of the rod 101 and a call for a greater pressure difference upon the orifices and greater delivery of steam to the radiators.

It will be seen, therefore, that I have provided a thermostat which in its own structure provides means responsive to variable atmospheric temperatures, variable incident heat rays from the sun, and variable wind effect upon the building.

As above explained the thermostat of Figure 4 may be applied to the system shown in Figure 1 and embodying the features of Figures 2 and 3.

In Figure 4A I have shown how the vanes 95 are applied to the body 91 to get substantially equal action from the wind in any quarter.

Figure 5:
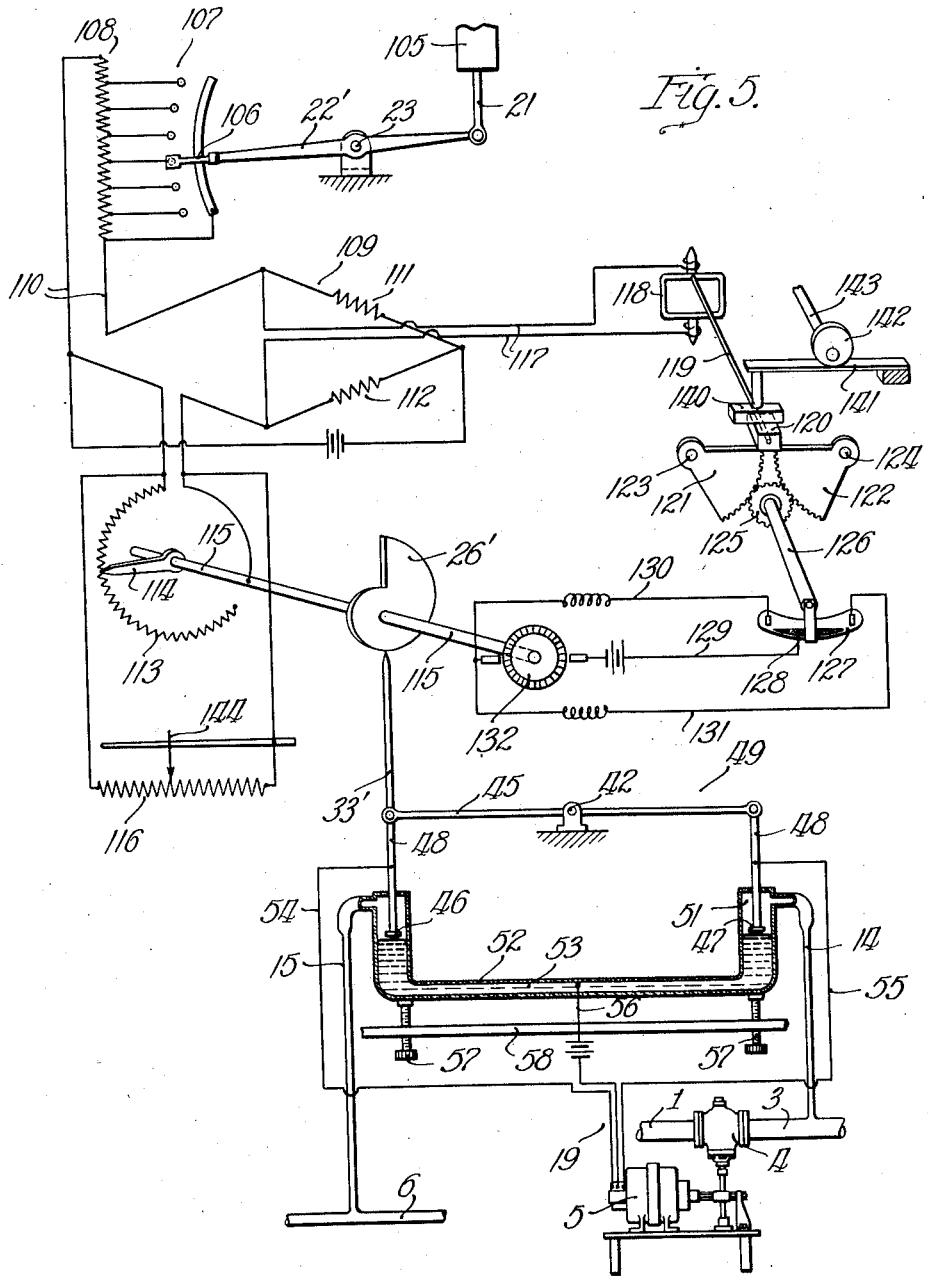
Figure 5 is a partial diagram of a system having an electric relay control between the thermostats and the valve controlling mechanism.

In Figure 5 I have shown a remote control operating mechanism for electrically transmitting the thermostatic control to the pressure difference control mechanism 49. In this case the thermostatic element 105 which may be either the same as the thermostat 13 or the thermostat 90 is connected to the stem 21 and it in turn connects with the lever 22', this lever controlling a contact member 106 cooperating with a contact bank 107 connected to the control resistance 108 forming one leg of the Wheatstone bridge circuit 109.

So much of the mechanism, namely, the thermostat, its lever, contact arm and contact bank with the resistance 108 may be disposed on the roof whereas the major part of the thermostatic circuit 109 with the other apparatus here to be described may be disposed at the control station as, for example, in the basement of the building.

The resistance 108 may be connected through the control wires 110 running from the roof of the building to the basement where the Wheatstone bridge circuit 109 is maintained. The two legs 111 and 112 of the Wheatstone bridge circuit 109 may be adjusted to proper values, for example, equal values, and the fourth arm of the bridge contains an adjustable resistance 113 under the control of a swinging contact member 114 mounted upon a shaft 115. A variable resistance 116 which may control percentage of full load is connected in shunt of the resistance 113 or so much of it as is connected in the bridge circuit. It will be observed that the resistance 116 acts like the variable fulcrum 38 in that in a position of the thermostat 105 corresponding to cold outside temperature the greater part of the resistance 113 will be included in the circuit and the resistance 116 has proportionately a larger effect upon the circuit. The Wheatstone bridge circuit 109 contains in its bridge connection, that is in series with the wires 117, the movable galvanometer coil 118 which contains a movable pointer 119 carrying a block 120. When the bridge is in balance the block 120 lies over the edges of the two gear sectors 121 and 122 pivotally mounted at 123 and 124, said gear sectors being connected together through the pinion 125.

The pinion 125 is connected through a rocking shaft 126 to a three contact mercury bulb switch 127, the central contact of which is indicated at 128 and connected to the body of mercury, said body of mercury when the bulb is tilted to one side or to the other making contact with the outer contact to close circuit from the common wire 129 to either the forward or reverse wires 130 and 131 for the reversible motor 132. The reversible motor 132 is in turn connected through the shaft 115 to the cam 26' and to the aforesaid movable contact 114.

A cam follower 33' is connected to the rocking lever 45 of the pressure difference control mechanism 49, which governs the operation of the motor 5 for opening and closing the valve 4 to control the pressure in the supply main 3 imposed upon the radiator orifices.

Cooperating with the block 120 is a presser or hammer member 140 mounted upon a spring arm 141, said spring arm being acted upon by cam 142 on the shaft 143. The shaft 143 is constantly driven at a uniform rate tending to depress the presser 140 which presser engages the block 120 upon each downward stroke pressing the block 120 which is mounted on the spring arm 119 downwardly. If the galvanometer coil 118 due to unbalance of the Wheatstone bridge circuit 109 springs the block 120 away from the neutral position sufficiently so that upon the next downward motion of the presser 140 said block 120 engages only one of the gear sectors 121 or 122 the result is a tilting of the mercury switch bulb 127 and closing of the circuit of the motor 132 to shift the position of the cam 26' and the contact 114 in a direction to restore balance.

Instead of periodic motion of the presser block, the gear sectors 121—122 and pinion 125 with connected parts may be swung up and down on a spring arm like the arm 141 the block 140 then remaining stationary. Also I may employ instead of the specific form of resistance varying thermostat herein shown, any preferred or known form of means responsive to temperature variation, for example a resistance thermometer of known construction.

Thus if the movement of the thermostat 105 is such as to shift the contact 106 with respect to the resistance 108 so as to vary said resistance, the Wheatstone bridge 109 will be unbalanced resulting in motion of the block 120 to one side or the other and a consequent closing of the circuit of the motor 132 in a direction to restore the balance by shifting the contact arm 114 with respect to the resistance 113.

It will be apparent to those skilled in the art that instead of using the variator resistance 116 with its adjustable contact 144 I may employ variable fulcrum between the cam follower and the operating rod for the pressure difference controlling member 45 in the device 49.

Also, it will be apparent to those skilled in the art that instead of embodying the variable relation between positions of the thermostat and positions of the pressure difference control contacts 46, 47 I may embody said equation in the relation of the resistances 108 and 113. That is to say, equal steps of motion by the thermostat 105 may cut out or cut in unequal steps of resistance on the bank of contacts 107 with a corresponding motion of the shaft 115 to compensate for the same.

It will now be apparent that I have provided a system in which by simple apparatus and mechanism the positions of the thermostat corresponding to variations in outside temperature are translated into corresponding percentages of filling of the radiators 2 and that means corresponding percentages of maximum heat emission at the radiators 2.

It will also be apparent that I have provided a thermostatic means sensitive to three variables which may be utilized in my system, or may be utilized in other control systems, for securing a heat delivery to the building to maintain it at a predetermined temperature or schedule of temperatures.

I have also provided a system in which a suitable remote operation mechanism may be interposed between the thermostat and the pressure difference responsive mechanism, such as 49, located at a point remote from the same and this is done preferably through an electrical connection.

It will be apparent also that I have provided in the several systems herein shown means for varying the percentage of loading throughout the entire range of temperature differences for which the system is designed.

In view of these fundamental features of novelty I do not intend to be limited to the precise details shown or described, and I consider it within the skill of the art both to embody in more commercial form than I have shown the teachings of my invention and to make such modifications as are in accordance with such teachings without departing from the scope of my invention.

While I have described steam as the heating fluid it is to be understood that I might use hot water and secure the variations of heat emission by controlling the temperature of the water or the rate of flow thereof through the radiators.

In the mechanisms shown in Figures 2 and 3, it is not necessary that a cam be supplied for moving the slide 40, as this could be adjusted by hand if suitable graduation is provided to determine the proper position for the movable pivot 38 for different desired percentages of full load.

It is to be understood that this system can be used with filled radiators in which the heat emission is controlled by varying the temperature of steam within the radiators. In such case, preferably, a constant differential between the return and supply is maintained by an element which is suitably responsive to variations in supply pressure for determining the return pressure, and the supply pressure may be controlled by mechanism such as indicated at 49 for governing the pressure in the supply main in accordance with a predetermined law.

The U-tube might have the contacts embedded in the walls or fixed in the walls otherwise and the entire U-tube be tilted to raise and lower the contacts with respect to the mercury instead of merely shifting the contacts 46, 47 through the walls of the U-tube.

Such a U-tube mechanism might control the suction instead of the pressure, that is to say, the valve 4 shown as controlling pressure might be a governing element controlling the suction in the return line 6.

Where separate controls of supply and return pressure are to be provided, more than one U-tube might be operated at the same time by the lever, such as 37, and instead of comparing the pressures between the return and supply, the pressure of either one might be determined against an arbitrary standard such as a head of liquid or the like.

I claim:

1. In a system of the class described the combination of means for supplying variable amounts of heating fluid to a building to be heated in proportion to the varying differences between a predetermined temperature and the variable temperature outside of the building throughout a given range of outside temperatures, said means comprising a cam and cam follower, the relation of throw to motion of the cam embodying the relation between pressure difference upon an orifice and the rate of flow therethrough, and thermostatic means imparting motion to said cam.

2. In a system of the class described the combination of means for supplying variable amounts of heating fluid to a building to be heated in proportion to the varying differences between a predetermined temperature and the variable temperature outside of the building throughout a given range of outside temperatures, said means comprising a cam and cam follower, the relation of throw to motion of the cam embodying the relation between pressure difference upon an orifice and the rate of flow therethrough, and means for selectively varying the percentage of normal rate of flow of heating fluid throughout the aforesaid range of outside temperatures.

3. In a system of the class described the combination of means for supplying variable amounts of heating fluid to a building to be heated in proportion to the varying differences between a predetermined temperature and the varying temperature outside of the building throughout a given range of outside temperatures, that means comprising a cam and cam follower, the relation of throw of the cam follower to motion of the cam embodying the relation between pressure difference upon an orifice and the rate of fluid flow therethrough, and means for selectively varying the percentage of normal rate of flow of heating fluid throughout the aforesaid range of outside temperature, said means comprising a cam and cam follower, the said second cam follower cooperating with the first cam follower.

4. In a system of the class described the combination of a thermostat responsive to outside temperatures, means controlled by said thermostat for supplying variable amounts of heating fluid to a building to be heated in proportion to the varying differences between a predetermined temperature and the variable temperature outside of the building throughout a given range of outside temperatures, said means comprising a cam and cam follower, the relation of throw of the follower to motion of the cam embodying the relation between pressure difference upon an orifice and the rate of fluid flow therethrough, and thermostatic means imparting motion to said cam.

5. In a system of the class described the combination of thermostatic means responsive to outside temperature, means controlled by said thermostatic means for supplying variable amounts of heating fluid to a building to be heated in proportion to the varying differences between a predetermined temperature and the variable temperature outside of the building throughout a given range of outside temperatures, said means comprising a cam and a cam follower, the relation of throw of the follower to motion of the cam embodying the relation between pressure difference upon an orifice and the rate of fluid flow therethrough and means for selectively varying the percentage of normal rate of flow of heating fluid throughout the aforesaid range of outside temperatures, said means comprising a cam and a cam follower and a member for controlling the flow of the heating fluid governed by both of said cam followers.

6. In combination radiators, orifices therefor, heating fluid supply means, heating fluid pressure controlling means between said supply means and the radiators, a thermostat, a cam actuated by the thermostat, a follower for the cam, the relation of throw of the follower to the motion of the cam embodying the relation of pressure difference upon the orifices and the consequent flow therethrough, and means governed by the throw of the follower for controlling said heating fluid pressure control means.

7. In combination radiators, orifices therefor, heating fluid supply means, heating fluid pressure controlling means between said supply means and the radiators, a thermostat, a cam governed by the position of the thermostat, a follower for the cam, the relation of throw of the follower to the motion of the cam embodying the relation of pressure difference upon the orifices and the consequent flow therethrough, means governed by the throw of the follower for controlling said heating fluid pressure control means, and means for selectively varying the percentage of normal rate of flow of heating fluid throughout the aforesaid range of outside temperatures, through which the thermostat is projected.

8. In combination radiators, orifices therefor, heating fluid supply means, heating fluid pressure controlling means between said supply means and the radiators, a thermostat, a cam governed by the position of the thermostat, a follower for the cam, the relation of throw of the follower to the motion of the cam embodying the relation of pressure difference upon the orifices and the consequent flow therethrough, means governed by the throw of the follower for controlling said heating fluid pressure control means, and means for selectively varying the percentage of normal rate of flow of heating fluid throughout the aforesaid range of outside temperatures, through which the thermostat is projected, said latter means comprising a cam and a cam follower said last named cam follower cooperating with the means governed by the throw of the first follower.

9. In combination radiators, heating fluid supply means, heating fluid flow control means between said supply means and radiators, a thermostat subject to outside temperatures, a cam governed by the position of a thermostat, a follower for the cam, and a lever governed by the throw of the follower for controlling said heating fluid flow controlling means, a movable pivot for said lever and means for moving the pivot to vary the percentage of normal flow of heating fluid throughout the range of temperatures to which the thermostat is subjected.

10. In combination radiators, inlet orifices therefor, heating fluid supply means, heating fluid pressure controlling means between said supply means and the radiator orifices, a thermostat subject to outside temperatures, a cam operated by said thermostat, a follower for the cam, the relation of throw of the follower to motion of the cam embodying the relation of pressure difference upon an orifice and the consequent flow of fluid therethrough, a lever controlled by said cam follower, and means governed by said lever for controlling said heating fluid pressure controlling means.

11. In combination radiators, inlet orifices therefor, heating fluid supply means, heating fluid pressure controlling means between said supply means and the radiator orifices, a thermostat subject to outside temperatures, a cam operated by said thermostat, a follower for the cam, the relation of throw of the follower to motion of the cam embodying the relation of pressure difference upon an orifice and consequent flow of fluid therethrough, a lever controlled by said cam follower, and means governed by said lever for controlling said heating fluid pressure controlling means, said lever having a movable pivot and means to move said movable pivot for varying the percentage of normal delivery of heating fluid to the radiators.

12. In combination radiators, heating fluid supply means, heating fluid pressure controlling means between said supply means and the radiators, a thermostat subject to outside temperatures, a movable cam the position of which is controlled by the position of the thermostat, a follower for the cam, a lever controlled by said follower, means controlled by the lever for governing the heating fluid pressure controlling means, said lever having a movable pivot, and means for adjusting said pivot to control the percentage of normal fluid delivery to the radiators.

13. In combination radiators, heating fluid supply means, heating fluid pressure controlling means between said supply means and the radiators, a thermostat subject to outside temperatures, a movable cam governed by the thermostat, a follower controlled by the cam, a lever operated by the follower, means controlled by the lever for governing said heating fluid pressure controlling means, a movable pivot for the lever, and a cam for controlling the position of the movable pivot.

14. In combination radiators, heating fluid supply means, heating fluid pressure controlling means between said supply means and the radiators, a thermostat subject to outside temperatures, a movable cam governed by the thermostat, a cam actuated by the thermostat, a follower for the cam, the relation between the throw of the follower and the motion of the cam embodying the relation between pressure of the heating fluid and the heat to be emitted by the radiators, and means governed by the throw of the follower for controlling said heating fluid pressure control means.

15. In combination radiators, heating fluid supply means, heating fluid pressure controlling means between said supply means and the radiators, a thermostat subject to outside temperatures, a movable cam governed by the thermostat, a cam governed by the position of the thermostat, a follower for the cam, the relation between the throw of the follower and the motion of the cam embodying the relation between pressure of the heating fluid and the heat to be emitted by the radiators, means governed by the throw of the follower for controlling said heating fluid pressure control means, and means for selectively varying the percentage of normal pressure of heating fluid throughout the range of temperatures to which the thermostat is subjected.

16. In combination radiators, heating fluid supply means, heating fluid pressure controlling means, a thermostat, a cam governed by the position of the thermostat, a cam follower, the relation between the throw of the follower and the motion of the cam embodying the relation between pressure of the heating fluid and the heat to be emitted by the radiators, means for selectively varying the percentage of normal pressure of heating fluid throughout the range of temperatures to which the thermostat is subjected, said means comprising a cam and a cam follower, the second cam follower cooperating with the first cam follower.

17. In combination radiators, heating fluid supply means, heating fluid pressure controlling means, a thermostat, a cam governed by the position of the thermostat, a cam follower, the relation between the throw of the follower and the motion of the cam embodying the relation between pressure of the heating fluid and the heat to be emitted by the radiators, means for selectively varying the percentage of normal pressure of heating fluid throughout the range of temperatures to which the thermostat is subjected, said means comprising a cam and a cam follower, the second cam follower cooperating with the first cam follower, and means governed by both of the cam followers for controlling said heating fluid pressure control means.

18. In combination a supply main, a return main, radiators between said mains, a U-tube having closed legs, a body of mercury in the tube extending into the legs, contacts in the legs, one of the legs being connected to the supply main the other of the legs being connected to the return main, and means for shifting the contacts simultaneously with respect to the mercury.

19. In combination a supply main, a return main, radiators between said mains, a U-tube having closed legs, a body of mercury in the tube extending into the legs, contacts in the legs, one of the legs being connected to the supply main, the other of the legs being connected to the return main, and means for shifting the contacts simultaneously with respect to the mercury, said means comprising a cam and cam follower.

20. In combination a supply main, a return main, radiators between said mains, a U-tube having closed legs, a body of mercury in the tube extending into the legs, contacts in the legs, one of the legs being connected to the supply main, the other of the legs being connected to the return main, means for shifting the contacts simultaneously with respect to the mercury, said means comprising a cam and cam follower, and a valve in the supply main controlled by said contacts.

21. In combination a supply main, a return main, radiators between said mains, a U-tube having closed legs, a body of mercury in the tube extending into the legs, contacts in the legs, one of the legs being connected to the supply main the other of the legs being connected to the return main, and thermostatically controlled means for shifting the contacts simultaneously with respect to the mercury.

22. In combination a supply main, a return main, radiators between said mains, a U-tube having closed legs, a body of mercury in the tube extending into the legs, contacts in the legs, one of the legs being connected to the supply main and the other of the legs being connected to the return main, thermostatically controlled means for shifting the contacts simultaneously with respect to the mercury, and a valve in the supply main controlled by said contacts.

23. In combination a supply main, a return main, radiators between said mains, a U-tube having closed legs, a body of mercury in the tube extending into the legs, contacts in the legs, one of the legs being connected to the supply main and the other of the legs being connected to the return main, means for shifting the contacts simultaneously with respect to the mercury, and means controlled by said contacts for governing the emission of heat at the radiators.

24. In combination a supply main, a return main, radiators between said mains, a U-tube having closed legs, a body of mercury in the tube extending into the legs, contacts in the legs, one of the legs being connected to the supply main and the other of the legs being connected to the return main, thermostatic means for shifting the contacts simultaneously with respect to the mercury, and means controlled by said contacts for governing the pressure in the supply main.

25. In combination a supply main, a return main, radiators between said mains, a U-tube having closed legs, a body of mercury in the tube extending into the legs, contacts in the legs, one of the legs being connected to the supply main, the other of the legs being connected to the return main, a thermostat, a cam controlled by the thermostat, a cam follower, and means controlled by the cam follower for shifting the contacts simultaneously with respect to the mercury.

26. In combination a supply main, a return main, radiators between said mains, a U-tube having closed legs, a body of mercury in the tube extending into the legs, contacts in the legs, one of the legs being connected to the supply main, the other of the legs being connected to the return main, a thermostat, a cam controlled by the thermostat, a cam follower, means controlled by the cam follower for shifting the contacts simultaneously with respect to the mercury, and means governed by the contacts for controlling the pressure of heating fluid in the supply main.

27. In combination a supply main, a return main, radiators between said mains, said radiators having inlet orifices, a U-tube having closed legs, a body of mercury in the tube extending into the legs, contacts in the legs, one of the legs being connected to the supply main, the other of the legs being connected to the return main, a thermostat, a cam controlled by the thermostat, a cam follower, the relation of throw of the follower to the motion of the cam embodying the relation of pressure difference upon the orifices and the consequent flow therethrough, means controlled by the cam follower for shifting the contacts simultaneously with respect to the mercury, and means governed by said contacts for controlling the pressure difference of heating fluid upon said orifices.

28. In combination a supply main, a return main, radiators between said mains, a U-tube having closed legs, a body of mercury in the tube extending into the legs, contacts in the legs, one of the legs being connected to the supply main, the other of the legs being connected to the return main, a thermostat, a cam controlled by the thermostat, a cam follower, the relation between the throw of the follower and the motion of the cam embodying the relation between pressure of the heating fluid and the heat to be emitted by the radiators, means controlled by the cam follower for shifting the contacts simultaneously with respect to the mercury, and means controlled by said contacts for varying the pressure of steam in the supply main.

29. In combination, a supply main, a return main, radiators between said mains, a movably disposed U-tube having closed legs, a body of mercury extending into said legs, contact means cooperating with said tube, one of said legs being connected to the supply main and the other of said legs being connected to said return main, and means for shifting said contact means relative to said tube.

30. In combination, a supply main, a return main, radiators between said mains, a movably disposed balancing device, a body of mercury disposed in said device, contact means cooperating with said balancing device, means for connecting said supply main and said return main to said device, means for shifting said contact means relative to said device, said means comprising a cam and a cam follower, and a valve in the supply main controlled by said contact means.

31. In combination, a supply main, a return main, radiators between said mains, a movably disposed balancing device, a body of mercury disposed within said device, contact means cooperating with said balancing device, the supply main and the return main being connected to said device, thermostatically controlled means for shifting said contact means relative to said device, and means controlled by said contact means for governing the emission of heat at said radiators.

32. In a system of the class described, a temperature responsive device for governing the actuation of heat supply control means for supplying heating fluid to radiators, a Wheatstone bridge responsive to said device, a movable cam actuated by said Wheatstone bridge, a supply main, a return main, said radiators being disposed between said mains, mercury balance means, said mains being connected to said mercury balance means, contact means cooperating with said movable balance means, and means including said movable cam for actuating said contact means.

33. In a system of the class described, a temperature responsive device for governing the actuation of heat supply control means for supplying heating fluid to radiators, a Wheatstone bridge responsive to said device, a movable cam actuated by said Wheatstone bridge, a supply main, a return main, said radiators being disposed between said mains, movably mounted mercury balance means, said mains being connected to said mercury balance means, contact means cooperating with said balance means, and means including said movable cam for shifting said contact means relative to said mercury balance means.

34. In a system of the class described, a temperature responsive device for governing the actuation of heat supply control means for supplying heating fluid to radiators, a Wheatstone bridge responsive to said device, a movable cam actuated by said Wheatstone bridge, a supply main, a return main, said radiators being disposed between said mains, movably disposed mercury balance means, said mains being connected to said mercury balance means, contact means cooperating with said balance means, means including said movable cam for shifting said contact means relative to said movably disposed balance means, and means controlled by said contact means for governing the emission of heat at said radiators.

35. In a system of the class described, a temperature responsive device for governing the actuation of heat supply control means for supplying heating fluid to radiators, a Wheatstone bridge responsive to said device, a movable cam actuated by said Wheatstone bridge, a supply main, a return main, said radiators being disposed between said mains, movably disposed balance means, a contact carried thereby, said mains being connected to said balance means, other contact means cooperating with the contact carried by said balance means, means including said movable cam for shifting said other contact means relative to said contact carried by said balance means, and means controlled conjointly by said contact and said other contact means for providing the emission of heat at said radiators.

36. In a system for supplying heating fluid to a building at rates proportional to the difference between outside temperature and a predetermined temperature which it is desired to maintain in the building, the combination of a thermostat responsive to outside temperature, a heating fluid supply means, a Wheatstone bridge having a controlling variable resistance, and a responsive member subject to the variations of said resistance controlling said heating fluid supply means, said controlling variable resistance being substantially uniformly graduated throughout, and a cam member movable uniformly in response to the thermostat and acting non-uniformly upon the resistance to vary the same.

37. In a system for supplying heating fluid to a building at rates proportional to the difference between outside temperature and a predetermined temperature which it is desired to maintain in the building, the combination of a thermostat responsive to outside temperature, a heating fluid supply means, a Wheatstone bridge having a controlling variable resistance, and a responsive member subject to the variations of said resistance controlling said heating fluid supply means, said controlling variable resistance being substantially uniformly graduated throughout, a cam member movable uniformly in response to the thermostat and acting non-uniformly upon the resistance to vary the same, and a multiplying resistance in shunt of said variable resistance for adjusting the heating rate throughout the temperature range of the system.

38. In a steam heating system having a supply line, a pressure regulating valve therein, a return line, and means differentially responsive to the steam pressures in said supply line and said return line for controlling said valve, the combination of a plurality of means including a wind meter, and a thermally sensitive element jointly operative to modify the control of said pressure responsive means upon said valve, and electrically operated manual control means for regulating the modifying action of said plurality of means.

HERBERT G. THOMAS.